Sept. 2, 1930.   H. W. HEFTER   1,774,885
ANTISKIDDING DEVICE
Filed March 12, 1928   2 Sheets-Sheet 1
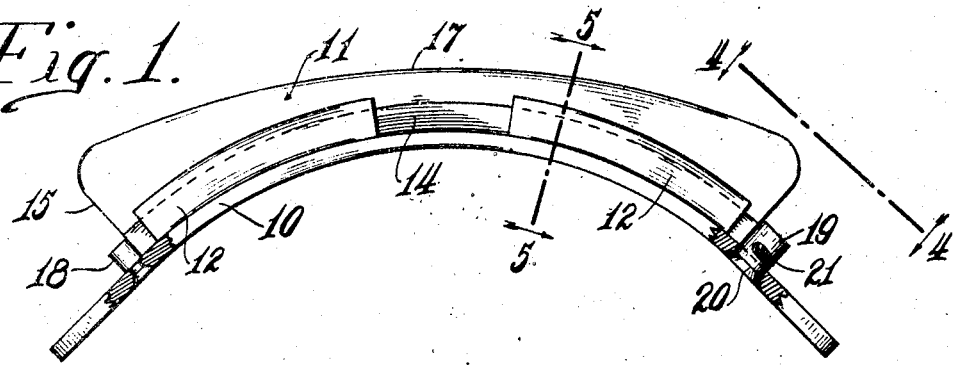
Fig. 1.
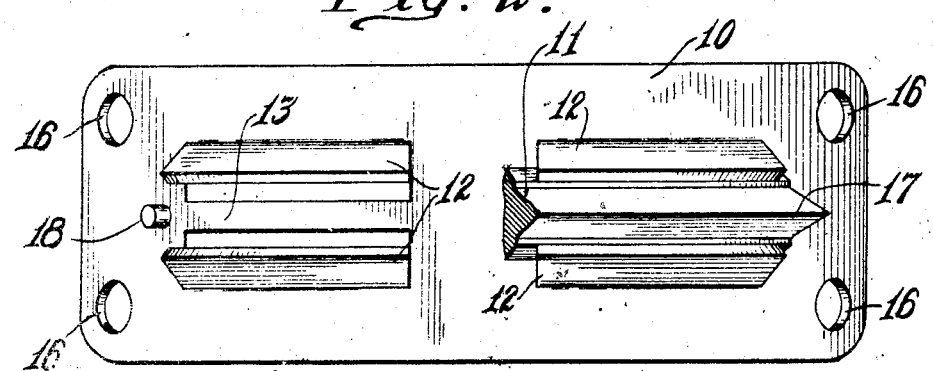
Fig. 2.
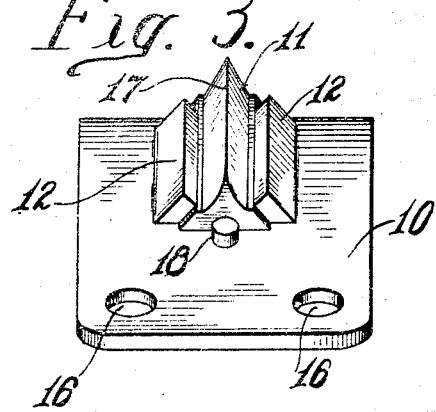
Fig. 3.
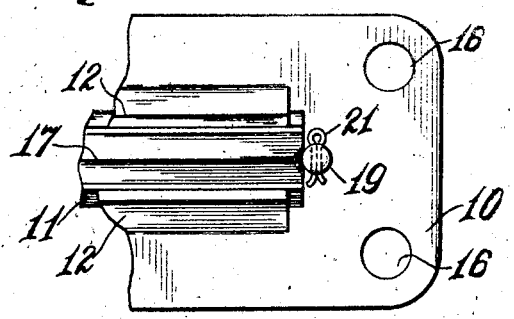
Fig. 4.
Fig. 5.
Fig. 6.
Inventor
Hans W. Hefter
Attorney

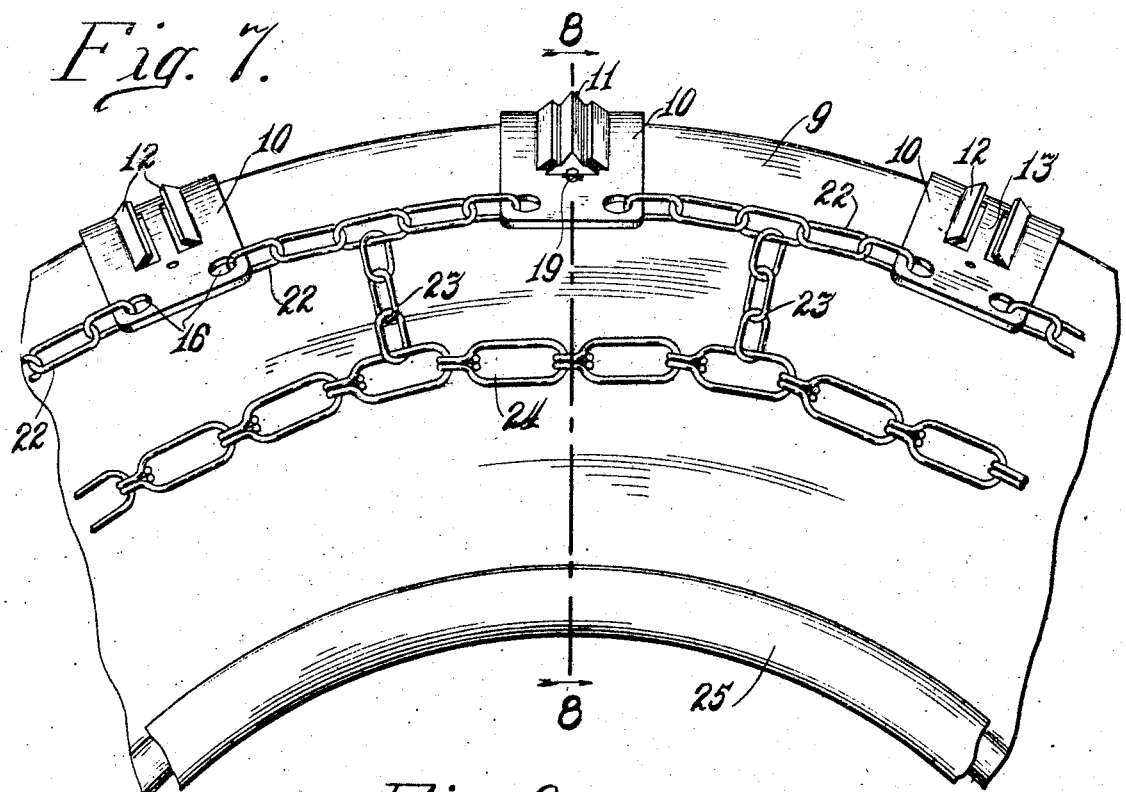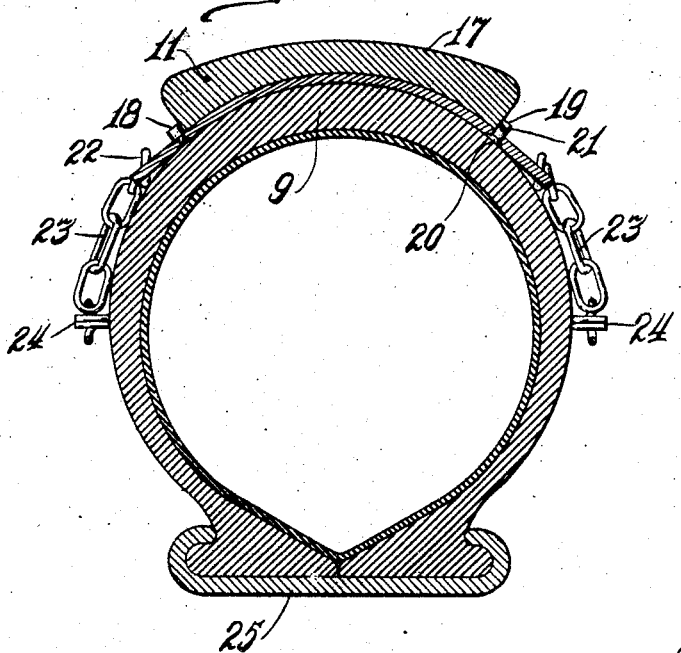

Patented Sept. 2, 1930

1,774,885

UNITED STATES PATENT OFFICE

HANS W. HEFTER, OF CHICAGO, ILLINOIS

ANTISKIDDING DEVICE

Application filed March 12, 1928. Serial No. 261,143.

The invention relates to an improved antiskid device for motor vehicles, and particularly to an improved traction element for such anti-skid devices. The new anti-skid device employs a plurality of traction elements, and the prime object of the invention is to provide each traction element with a detachable gripping member, which is very efficient when the motor vehicle travels over snow, ice or mud, or even slippery roads.

The invention has as further object to arrange the gripping member of said traction element in such manner that the same may be readily removed and replaced by other gripping members of different shape and size, as the purpose for which the anti-skidding device is to be used may require.

A still further object of the invention resides in the novel construction of the gripping member, which permits reconditioning of the gripping edge when the same is worn after longer use.

With the foregoing in view, the invention resides in the novel subject matter hereinafter described and claimed, the description being supplemented by the accompanying drawings.

In the drawing:

Fig. 1 is a front elevation view of one complete traction element, partly in section;

Fig. 2 is a plan view thereof, with a part of the gripping member broken away;

Fig. 3 is a side elevation of the traction element;

Fig. 4 is a fragmentary plan view on the line 4—4 of Fig. 1;

Fig. 5 is a sectional view on line 5—5 of Fig. 1;

Fig. 6 is a sectional view similar to Fig. 5 of a modified embodiment;

Fig. 7 is a fragmentary elevation of a tire, to which the novel anti-skidding device is applied, and Fig. 8 is a transverse sectional view on line 8—8 of Fig. 7.

Referring to the drawings in detail, each traction element comprises a curved plate member 10, the curvature of which corresponds substantially over its major length with the transverse curvature of the tire 9, and a separate gripping member 11 which is removably attached to said plate member 10. The curved plate member 10 preferably is formed of a single strip of sheet metal of suitable strength, the ends of which are formed tangentially to the curvature of the tire 9 to accommodate the chain sections 22 which loosely engage openings 16 in the corners of the plate member 10. Formed on the plate member 10, parallel to its side edges, are outwardly extending flanges 12 disposed at oppositely inclined angles to the plate member 10. Said flanges 12 are struck from the median portion of the plate member 10 to form a guide and anchoring means for the gripping member 11 which slidably engages the flanges 12. The flanges 12, which also serve as reinforcement of the plate member 10 are struck from said plate member 10 in such manner, that between the two oppositely disposed flanges 12 a web 13 is formed which serves as a support for the gripping member 11. The flanges 12 preferably do not extend over the whole length of the plate member 10, but are interrupted in the center portion of the same.

Each gripping member 11 preferably consists of a longitudinal curved base portion 14 provided with an upstanding rib 15, integrally formed therewith. The curvature of said base portion 14 conforms to the curvature of the plate member 10, and the longitudinal edges are bevelled to be engaged by the inclined flanges 12 struck from the plate member 10. The gripping member 11, by means of its bevelled longitudinal edges is fitted between said flanges 12 and may be readily withdrawn from the plate member 10 by moving the members 10 and 11 longitudinally relatively to each other.

The upstanding rib 15 of said gripping member 11 preferably is triangular in cross-section, as shown in Fig. 5, the base of the triangle being smaller than the upper face of the base portion 14, while the point of the triangle extends substantially beyond the highest point of the flanges 12. The gripping edge 17 is also curved, but substantially less than the base portion 14, so that the end portions of the rib 15 are of greater height than the center portion of the same, as shown in Figs. 1 and 8.

It is obvious from the above description that the shape and size of the rib 15 may be altered as the conditions may require, e. g., the rib 15 may be rectangular or trapezoidal in cross-section, and that as long as the base portion 14 remains unchanged, the same plate member 10 may be used. Furthermore, the gripping member 11 may be readily removed from the plate member 10, as above described, to resharpen the gripping edge 17 when it has become dull after longer use. The gripping members 11 and 11', as shown in the drawings, are intended for average use in the city, and it is apparent that for use in the country, where muddy and snow covered roads are to be encountered more frequently—a gripping member 11 with a substantially higher rib 15 may be selected.

In Fig. 6 is shown a modified gripping member 11' which consists of a single bar, triangular in cross-section. This gripping member 11' may be of uniform cross-section throughout its whole length and, of course, is more easy to produce than the gripping member 11 shown in Fig. 5. The gripping edge 17' of the gripping member 11' may be resharpened in the same manner as the gripping member 11.

The gripping members preferably are made of wrought iron or steel or other materials suitable for this purpose. If desired, the gripping members may be hardened or case hardened to obtain a greater durability of the same.

To secure the gripping member 11 in position on the plate member 10, there is provided on each end of the plate member 10 an abutment against which the end faces of the gripping member 11 rest. These abutments may be of any desired construction and preferably consist of studs 18 and 19, one of which is fixedly secured to the plate member 10 in any well known manner, while the other one is removably secured thereto to permit removal of the gripping member 11 from said plate member 10. For this purpose the stud 19 extends through an opening in said plate member 10 and is provided with a conical enlargement or head 20 which rests in a corresponding conical seat on the lower face of said plate member 10. The outwardly extending end of the stud 19 is provided with a transverse opening through which a cotter pin 21 extends which bears against the upper face of the plate member 10 and prevents accidental removal of the stud 19.

To remove the gripping member 11 from the plate member 10, all that is necessary is to remove the cotter pin 21 and to withdraw the stud 19. Then the gripping member 11 may be easily withdrawn and another gripping member 11 may be slipped upon the plate member 10, whereupon the stud 19 is again inserted in its opening and secured in place by means of the cotter pin 21. When the plate member 10 is attached to the tire by chains or the like, as hereinafter described, the removal and replacement of the detachable gripping member 11 in the described manner may be conveniently accomplished while the plate member 10 remains on the tire, since the flexibility of the chains permit a slight lifting of one end of the plate member 10 so that the stud 19 may be withdrawn and re-inserted.

The anti-skidding device of the present invention comprises a plurality of traction elements, as above described, which are uniformly spaced from each other by peripherally arranged chain sections 22 on the tread of the tire 9 mounted on a conventional rim 25. Said chain sections 22 extend between corresponding corners of adjacent plate members 10 and the end links are loosely engaged in the openings 16 of the plate members 10. From the center portion of each chain section 22 a short chain section 23 extends transversely to the circumference of the tire 9 and is connected to a side chain 24 placed annularly about the tire 9. There are provided, of course, two side chains 24, one on each side of the tire.

In this manner a flexible band of uniformly spaced traction elements connected with each other by chain sections is formed, which may be applied in the same manner as the ordinary tire chains are applied. The arrangement of the new traction elements, however, has the advantage that any skidding, even under the most dangerous circumstances, is efficiently prevented where tire chains would fail, thus rendering the driving over slippery, icy, muddy or snow covered roads absolutely safe.

The connection of the traction elements by means of the chain sections 22, 23 and the side chains 24 is shown by way of example only, and it is obvious that any other connecting means may be provided to connect two traction elements with each other and to secure the same to the tire. The ends of the side chains 24, as well as the ends of the last chain sections 22 may be provided with any ordinary or preferred locking means, not shown, which permit easy application and removal of the anti-skidding device.

It will be obvious that the above described invention is susceptible of some changes and modifications without departing from the principles and spirit thereof, and for this reason it is to be understood that the invention is not limited to the precise arrangement and formation of the several parts herein shown and described.

What I claim is:

1. A traction element for vehicle wheels, comprising a longitudinal plate member provided with oppositely arranged and oppositely inclined outwardly extending flanges which are struck from the plate member formed of sheet metal, a web remaining in the plate member extending longitudinally between said oppositely inclined flanges, and a longitudinal detachable gripping member locked in position between said web and said flanges having a rib of greater height than said flanges, said plate member being provided with means abutting the ends of said gripping member to prevent longitudinal movement of the same, at least one of said means being removable.

2. An anti-skidding traction device for vehicle tires, comprising a longitudinal plate extending across the tread of the tire, two pairs of oppositely inclined flanges struck from the plate and arranged in longitudinal direction of said plate in alignment with each other, a web between said flanges extending between the end portions of the plate and the center portion of the same, which center portion separates the pairs of flanges from each other and a longitudinally removable gripping member having a rib extending outwardly beyond said flanges locked against vertical movement between said pairs of flanges and supported by the end and center portions of said plate and said webs between the pairs of flanges, and means secured at the end portions of said plate and abutting the ends of said gripping member to prevent sliding movement of the same at least one of said last named means being removable to permit replacement of said gripping member.

3. An anti-skidding traction device for vehicle tires, comprising a rectangular plate extending longitudinally across the tread of the tire, two pairs of oppositely inclined flanges struck from the plate and extending parallel to the sides thereof and being in alignment with each other, a web between said flanges positioned in the plane of the plate and extending between the end portions of the plate and the center portion of the same, which center portion separates the pairs of flanges from each other, the corners of said plate being provided with holes adapted to receive means securing the plate on the tire, and a detachable longitudinal gripping member held against lateral and vertical movement by said pairs of flanges engaging the sides of said gripping member having an upstanding rib extending beyond said flanges, said gripping member being supported by the end and center portions of said plate and said web extending between each pair of said flanges, and pins secured at the end portion of the plate adapted to abut the ends of the gripping member to normally prevent longitudinal movement of the same, at least one of said pins extending loosely through the plate and having a head flush with the bottom surface of said plate, the protruding end of said pin abutting the end of the gripping member being provided with a detachable cross member to permit ready removal of said pin and replacement of said gripping member.

4. In an anti-skidding device for vehicle tires, a longitudinal plate transversely arranged on the tread of the tire and having a pair of oppositely inclined flanges struck up between its longitudinal edges and parallel thereto, a strip-like web extending parallel to and between said flanges, an upstanding stud at each end of said plate adjacent the outer ends of said web, one of said studs being removable without removing the plate from the tire, and a longitudinal gripping member longer than said flanges adapted to be lengthwise insertable between the same to rest on said web and on the ends of said plate, said studs abutting loosely against the end faces of said gripping member, and said gripping member being adapted to be slidably removed from the plate while the latter is on the tire after one of said studs is removed.

5. In an anti-skidding device for vehicle tires, a longitudinal plate transversely arranged on the tread of the tire, a pair of oppositely inclined flanges struck from said plate between the longitudinal edges thereof and parallel thereto, a web between said flanges, an upstanding stud at each end of said plate, one of said studs being removable while the plate is on the tire, the corners of said plate being provided with holes for the connection of chain links thereto, and a longitudinal gripping member with an upstanding rib loosely and slidably insertable between said flanges and resting upon said web and on the ends of said plate, said studs abutting against the end faces of said gripping member, and said gripping member being adapted to be exchanged while the plate remains on the tire when one of said studs is removed.

6. In an anti-skidding device for vehicle tires, the combination with side chains, of a plurality of curved solid two-piece cross members extending transversely of the tire, one piece of said cross members consisting of a longitudinal plate connected at its corners with said side chains and having a pair of oppositely inclined flanges struck up between its longitudinal edges, a web remaining between said flanges, and an upwardly projecting stud at each end of said plate, the other piece of said cross members having a gripping edge and being loosely slidably inserted between said flanges to rest on said web and on the ends of said plate, said flanges being adapted to prevent lateral and vertical displacement and said studs abutting against the end faces of said inserted piece preventing lengthwise displacement of the latter relatively to the plate, said inserted piece being adapted to be lengthwise slidably removed from the plate while the plate remains on the tire when one of said studs is removed.

In witness whereof I affix my signature.

HANS W. HEFTER.